United States Patent
Baldemair et al.

(10) Patent No.: US 12,225,552 B2
(45) Date of Patent: *Feb. 11, 2025

(54) ACKNOWLEDGEMENT SIGNALING PROCESSES FOR RADIO ACCESS NETWORKS

(71) Applicant: Telefonaktiebolaget LM Ericsson (publ), Stockholm (SE)

(72) Inventors: Robert Baldemair, Solna (SE); Daniel Chen Larsson, Lund (SE); Jung-Fu Cheng, Fremont, CA (US); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,520

(22) Filed: Oct. 16, 2023

(65) Prior Publication Data
US 2024/0040580 A1    Feb. 1, 2024

Related U.S. Application Data

(63) Continuation of application No. 17/143,457, filed on Jan. 7, 2021, now Pat. No. 11,818,722, which is a
(Continued)

(51) Int. Cl.
*H04W 72/23* (2023.01)
*H04L 1/1607* (2023.01)
(Continued)

(52) U.S. Cl.
CPC .......... *H04W 72/23* (2023.01); *H04L 1/1614* (2013.01); *H04L 1/1825* (2013.01); *H04L 1/1861* (2013.01); *H04L 1/1896* (2013.01)

(58) Field of Classification Search
CPC .... H04W 72/23; H04L 1/1614; H04L 1/1825; H04L 1/1861; H04L 1/1896
(Continued)

(56) References Cited

U.S. PATENT DOCUMENTS

| 2010/0254329 | A1 | 10/2010 | Pan et al. |
| 2012/0263121 | A1 | 10/2012 | Chen et al. |

(Continued)

FOREIGN PATENT DOCUMENTS

| CN | 101785230 A | 7/2010 |
| CN | 102754381 A | 10/2012 |

(Continued)

OTHER PUBLICATIONS

International Search Report and Written Opinion dated Sep. 17, 2018 for International Application No. PCT/SE2017/051003 filed on Oct. 11, 2017, consisting of 20-pages.
(Continued)

*Primary Examiner* — Obaidul Huq
(74) *Attorney, Agent, or Firm* — Weisberg I.P. Law, P.A.

(57) ABSTRACT

There is disclosed a method of operating a user equipment in a radio access network. The method includes transmitting acknowledgement signaling based on a feedback configuration, the feedback configuration being selected from a set of configured acknowledgement configurations. The disclosure also pertains to related methods and devices.

12 Claims, 3 Drawing Sheets

Related U.S. Application Data continuation of application No. 16/294,522, filed on Mar. 6, 2019, now Pat. No. 10,917,882, which is a continuation of application No. PCT/SE2017/051003, filed on Oct. 11, 2017.

(51) Int. Cl.
  *H04L 1/1825* (2023.01)
  *H04L 1/1829* (2023.01)
  *H04L 1/1867* (2023.01)

(58) Field of Classification Search
  USPC .................................... 370/310, 328, 329
  See application file for complete search history.

(56) References Cited

U.S. PATENT DOCUMENTS

| | | | |
|---|---|---|---|
| 2013/0107846 | A1 | 5/2013 | Chen et al. |
| 2014/0213237 | A1 | 7/2014 | Yang et al. |
| 2014/0341091 | A1 | 11/2014 | Ji et al. |
| 2015/0223235 | A1 | 8/2015 | Hwang et al. |
| 2015/0289144 | A1 | 10/2015 | Yi et al. |
| 2016/0261379 | A1 | 9/2016 | Bergstrom et al. |
| 2016/0380727 | A1 | 12/2016 | Ryu et al. |
| 2017/0150523 | A1 | 5/2017 | Patel et al. |
| 2017/0207895 | A1 | 7/2017 | Yang et al. |
| 2017/0257860 | A1 | 9/2017 | Nam et al. |
| 2017/0265207 | A1 | 9/2017 | Takeda et al. |
| 2018/0145796 | A1 | 5/2018 | Liang et al. |
| 2018/0278379 | A1 | 9/2018 | Sun et al. |
| 2018/0302128 | A1 | 10/2018 | Akkarakaran et al. |
| 2020/0204328 | A1* | 6/2020 | He ................. H04L 5/0055 |
| 2020/0304248 | A1 | 9/2020 | Lunttila et al. |

FOREIGN PATENT DOCUMENTS

| | | | |
|---|---|---|---|
| CN | 103490864 | A | 1/2014 |
| CN | 103731245 | A | 4/2014 |
| CN | 104137573 | A | 11/2014 |
| EP | 2234308 | A1 | 3/2009 |
| EP | 2824861 | A1 | 1/2015 |
| KR | 20170091489 | A | 8/2017 |
| WO | 2011044170 | A1 | 4/2011 |
| WO | 2017078033 | A1 | 5/2017 |
| WO | 2017133000 | A1 | 8/2017 |
| WO | 2017136199 | A1 | 8/2017 |
| WO | 2017168039 | A1 | 10/2017 |
| WO | 2017173051 | A1 | 10/2017 |

OTHER PUBLICATIONS

3GPP TSG RAN WG1 Meeting #90bis R1-1718034; Title: Discussion on HARQ-ACK transmission; Source: OPPO; Agenda Item: 7.3.3.2; Document for: Discussion and Decision; Location and Date: Prague, CZ, Oct. 9-13, 2017, consisting of 4-pages.
3GPP TS 38.213 V1.0.2; 3rd Generation Partnership Project; Technical Specification Group Radio Access Network; NR; Physical layer procedures for control (Release 15); Oct. 2017, consisting of 21-pages.
3GPP TSG RAN WG1 Meeting 90bis R1-1718708; Title: CBG A/N multiplexing for CA and cross-slot scheduling; Source: Sequans; Agenda Item: 7.3.3.3; Document for: Discussion and Decision; Location and Date: Prague, CZ, Oct. 9-13, 2017, consisting of 4-pages.
3GPP TSG RAN WG1 Meeting #89 R1-1707175; Title: CBG based transmissions; Source: ZTE; Agenda Item: 7.1.3.3.5; Document for: Discussion and Decision; Location and Date: Hangzhou, China, May 15-19, 2017, consisting of 7-pages.
Japanese Office Action with English Summary Translation dated May 21, 2021 for Japanese Patent Application No. 2020519773, consisting of 6-pages.
3GPP TSG RAN WG1 #90 R1-17104016; Title: On HARQ feedback determination; Agenda Item: 6.1.3.3.5.2; Source: Nokia, Nokia Shanghai Bell; Document for: Discussion and Decision; Date and Location: Aug. 21-25, 2017, Prague, Czech Republic, consisting of 5-pages.
Indian Office Action dated Nov. 5, 2021 for Application No. 202047019093, consisting of 6 pages.
Japanese Notice of Allowance and English machine translation dated Apr. 15, 2022 for Application No. 2020-519773, consisting of 6 pages.
3GPP TSG-RAN WG2 Meeting #99 R2-1709270; Revision of R2-1707003; Title: Discussion on HARQ configuration in NR; Agenda item: 10.3.1.9; Source: Huawei, HiSilicon; Document for: Discussion and Decision; Location and Date: Berlin, Germany, Aug. 21-25, 2017, consisting of 3 pages.
Chinese Office Action and English Translation dated Jul. 26, 2022 for Application No. 201780097580.2, consisting of 14 pages.
3GPP TS 38.213 V1.0.2; 3rd Generation Partnership Project; Technical Specification Group Radio Access Network; NR; Physical layer procedures for control (Release 15); Oct. 2017, consisting of 23 pages.
3GPP TSG RAN WG1 Meeting #74bis R1-134388; Title: Remaining Details of HARQ Timeline and Feedback; Agenda item: 7.2.1.3; Source: LG Electronics; Document for: Discussion and Decision; Location and Date: Guangzhou, China, Oct. 7-11, 2013, consisting of 4 pages.
3GPP TSG RAN WG1 Meeting #88 R1-1702486; Title: Discussion on scheduling and HARQ feedback for NR; Agenda Item: 8.1.3.3.1; Source: LG Electronics; Document for: Discussion and decision; Location and Date: Athens, Greece Feb. 13-17, 2017, consisting of 8 pages.
Chinese Office Action with English summary translation dated Mar. 31, 2023 for Chinese Patent Application No. 2017800975802, consisting of 18-pages.
European Communication and Search Report dated Jun. 12, 2023 for Application No. 17787668.7, consisting of 5 pages.
Chinese Office Action and English Summary dated Dec. 18, 2023 for Application No. 201780097580.2, consisting of 9 pages.
3GPP TS 36.213 V10.12.0; 3rd Generation Partnership Project; Technical Specification Group Radio Access Network; Evolved Universal Terrestrial Radio Access (E-UTRA); Physical layer procedures (Release 10); Mar. 2014, consisting of 127 pages.
Chinese Office Action and English machine translation dated May 10, 2024 for Application No. 201780097580.2 consisting of 8 pages.
Japanese Office Action and English summary dated May 24, 2024 for Application No. 2022079673, consisting of 5 pages.
3GPP TSG RAN1 WG1 Meeting #90bis R1-1718645; Title: On HARQ Management; Agenda Item: 7.3.3.2; Source: Ericsson; Document for: Discussion, Decision; Location and Date: Prague, Czech Republic, Oct. 9-13, 2017, consisting of 10 pages.

\* cited by examiner

ACKNOWLEDGEMENT SIGNALING PROCESSES FOR RADIO ACCESS NETWORKS

CROSS-REFERENCE TO RELATED APPLICATIONS

This application is a continuation of U.S. application Ser. No. 17/143,457 filed Jan. 7, 2021, which is a continuation of U.S. application Ser. No. 16/294,522 filed on Mar. 6, 2019, now U.S. Pat. No. 10,917,882, which is a continuation of International Application No. PCT/SE2017/051003, filed Oct. 11, 2017, the entireties of all of which are incorporated herein by reference.

TECHNICAL FIELD

This disclosure pertains to wireless or telecommunication communication technology, in particular to radio access technology, e.g. for mobile communication.

BACKGROUND

Currently, radio telecommunication technology of 5th Generation is being developed, with the goal to serve a large variety of use cases. Accordingly, the related systems have to be very flexible. Such flexibility, however, can introduce undesirable signaling overhead.

One field that is of particular importance for many applications is related to acknowledgement signaling processes, which determine whether transmitted data has been received correctly, or should be retransmitted. Examples of such processes include HARQ and ARQ processes.

SUMMARY

It is an object of this disclosure to present approaches allowing efficient (e.g., incurring low signaling overhead) and flexible acknowledgement signaling. The approaches are particularly advantageously implemented in a $5^{th}$ Generation (5G) telecommunication network or 5G radio access technology or network (RAT/RAN), in particular according to 3GPP (3rd Generation Partnership Project, a standardization organization). A suitable RAN may in particular be a RAN according to NR, for example release 15 or later, or LTE Evolution.

Accordingly, there is disclosed a method of operating a user equipment in a radio access network. The user equipment according to this approach may be referred to as acknowledging user equipment. The method comprises transmitting acknowledgement signaling based on a feedback configuration, the feedback configuration being selected from a set of configured acknowledgement configurations.

Moreover, a user equipment for a radio access network may be considered, which may be referred to as acknowledging user equipment. The user equipment is adapted for transmitting acknowledgement signaling based on a feedback configuration, the feedback configuration being selected from a set of configured acknowledgement configurations. The user equipment may comprise, and/or be adapted for utilizing, processing circuitry and/or radio circuitry, in particular a transmitter and/or transceiver and/or receiver, for transmitting such signaling and/or receiving transmission to which the acknowledgment signaling pertains, respectively. Alternatively, or additionally, the user equipment may comprise a transmitting module and/or a receiving module for such transmitting and/or receiving.

Alternatively, or additionally, a method of operating a user equipment in a radio access network may be considered, wherein the method comprises performing retransmission of data in an acknowledgement signaling procedure, wherein retransmission is performed based on a retransmission configuration. The user equipment according to this approach may be referred to as retransmitting user equipment.

A user equipment for a radio access network may be considered, which may be referred to as retransmitting user equipment. The user equipment is adapted for performing retransmission of data in an acknowledgement signaling procedure, wherein retransmission is performed based on a retransmission configuration. The user equipment may comprise, and/or be adapted for utilizing, processing circuitry and/or radio circuitry, in particular a transmitter and/or transceiver and/or receiver, for performing retransmission and/or receiving the retransmission configuration, respectively. Alternatively, or additionally, the user equipment may comprise a transmitting or retransmission module and/or a receiving module for such (re-) transmitting and/or receiving.

Performing retransmission may be considered a form of transmitting signaling. The signaling may represent data already transmitted. In some cases, performing retransmission based on a retransmission configuration may be considered to comprise transmitting of new data and/or performing no retransmission, e.g. as indicated by the configuration. Accordingly, a retransmitting user equipment may be adapted and/or configurable for retransmission, but does not necessarily and/or at all times have to perform retransmission. It should be noted that an acknowledgement signaling procedure pertaining to the retransmission as indicated herein may pertain to different data, and/or different communication direction, and/or a different acknowledgement signaling procedure or process, than the acknowledgement signaling transmitted based on the feedback configuration.

A user equipment (UE) may be considered that is adapted both as retransmitting UE and as feedback UE, and/or adapted to perform both or either of the methods of operating a UE as described herein. Instead of a user equipment, a corresponding radio node may be considered, e.g. in a backhaul or relay scenario, in which the radio node may for example be a corresponding network node. Thus, generally, the term user equipment may be replaced with the term radio node.

There may generally be considered a method of operating a radio node in a radio access network. The method comprises configuring a user equipment with one or more acknowledgement configurations of a set of acknowledgement configurations and/or with a retransmission configuration.

Also, a radio node for a radio access network is described. The radio node is adapted for configuring a user equipment with one or more acknowledgement configurations of a set of acknowledgement configurations and/or with a retransmission configuration. The radio node may comprise, and/or be adapted for utilizing, processing circuitry and/or radio circuitry, in particular a transmitter and/or transceiver and/or receiver, for configuring, and/or for receiving data signaling based on which the retransmission configuration may be configured, and/or for receiving acknowledgement signaling (which may be based on a configuration of the set), respectively. Alternatively, or additionally, the user equipment may comprise a corresponding configuring module and/or a receiving module.

The radio node may be implemented as a network node, in particular a base station like a gNB or eNB. However, implementations as UE may be considered, in particular in the context of sidelink communication. The radio node may configure the UE with all configurations of the set. Alternatively, or additionally, the UE may determine at least one configuration based on another configuration, e.g. by modifying it.

Acknowledgement signaling transmitted based on the feedback configuration may be uplink signaling, data signaling to which the acknowledgement signaling pertains may be downlink signaling. However, variants in which both may be sidelink signaling (with different communication directions) are envisioned. A retransmission configuration may be configured with signaling in downlink, e.g. in response to received uplink signaling, e.g. data signaling or control signaling. In some cases, a retransmission configuration may be configured with sidelink signaling, e.g. in response to received sidelink signaling (in the other direction).

A set of acknowledgement configuration may comprise more than one configuration, in particular two or more, 3 or more or 4 or more configurations. The feedback configuration may be one the acknowledgement configurations. The set may explicitly or implicitly comprise a plurality of configurations. For example, a second configuration may be implicitly comprised based on a first configuration if the first configuration is subject to one or more changes or deviations when selected as feedback configuration, and/or if the second configuration is derivable from the first configuration, e.g. unambiguously and/or based on predefined and/or configured and/or configurable rules.

Acknowledgement signaling may generally represent and/or comprise and/or contain acknowledgement information, which may be structured based on the feedback configuration.

Acknowledgement information may represent and/or comprise one or more bits, in particular a pattern of bits. The structure of acknowledgement information may indicate the order, and/or meaning, and/or mapping, and/or pattern of bits (or subpatterns of bits) of the information. An acknowledgment configuration, in particular the feedback configuration, may indicate the size of, and/or arrangement and/or mapping of bits of, acknowledgement information carried by the acknowledgement signaling the configuration pertains to. The structure or mapping may in particular indicate one or more data block structures, e.g. code blocks and/or code block groups and/or transport blocks the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

Selecting a feedback configuration may comprise changing and/or adapting an acknowledgement configuration of the set of acknowledgement configurations.

Generally, an acknowledgement configuration of the set may be configured or configurable, e.g. with control signaling, and/or be predefined. The set may be based on differently configured and/or predefined configurations.

It may in general be considered that the feedback configuration is selected based on received signaling, in particular at least one signaling characteristic of received signaling and/or information carried by received signaling. The signaling characteristic may in particular pertain to a timing and/or resource pool, e.g. a symbol of reception and/or the arrangement of the symbol in a transmission timing structure like a slot, and/or the CORESET in which it is received. In some examples, e.g. alternatively, or additionally, the signaling characteristics may indicate whether the received signaling is slot-based signaling or non-slot based signaling (e.g., in a mini-slot). The received signaling may generally be control signaling, e.g. a scheduling assignment, which may be associated to a control channel, e.g. a PDCCH or PSCCH. The control signaling may indicate data signaling to be received by the UE, e.g. on a data channel like a PDSCH or PSSCH. A signaling characteristic may alternatively, or additionally, pertain to a transmission or signaling to which the acknowledgement information pertains. The signaling characteristic may for example be the transmission duration and/or bandwidth (in frequency space) and/or transmission size and/or transport block size and/or number of code blocks or code block groups, or similar. Generally, any characteristic based on which two transmissions (actual, or scheduled) may be distinguished may be suitable.

An acknowledgement configuration, in particular the feedback configuration, may generally indicate the number of bits of acknowledgement information represented by the acknowledgement signaling, and/or the size of the acknowledgement information, wherein the size might be represented by a number of bits and/or number of modulation symbols.

It may be considered that an acknowledgement configuration, in particular the feedback configuration, may indicate a mapping of one or more acknowledgment bit subpattern/s to one or more data block structures to which the acknowledgement bit subpatterns pertain, e.g. to one or more code block groups or one or more transport blocks, or a combination thereof. An acknowledgement bit pattern may represent acknowledgement information, an acknowledgement bit subpattern may represent a subpattern of the pattern.

The acknowledgment configurations of the set of acknowledgment configurations may pertain to the same carrier and/or bandwidth part. In some cases, the configurations may pertain to the same carrier aggregation, or a set of carriers or bandwidth parts, e.g. an active set or a configured set.

Generally, it may be considered that one or more acknowledgement configuration of the set indicate that acknowledgement information is to be provided to indicate reception of a transport block, e.g. such that it is indicated with a bit or a subpattern to be received correctly only if all code blocks of the transport block have been correctly received. One or more other configurations may indicate that bits or subpatterns are to be provided for one or more code block groups, and/or one or more code blocks, which may be associated to a transport block. Based on the configuration selected as feedback configuration, different numbers of bits would be included in the acknowledgement information.

One or more acknowledgement configurations of the set of acknowledgement configurations may configured with control signaling, for example higher layer signaling like RRC signaling and/or MAC signaling. The configurations may be semi-static, allowing limiting the signaling overhead on lower level control signaling, e.g. DCI signaling.

A transmission format may generally indicate one or more data block structures or substructures for transmission or reception, and/or how a data block like a transport block (and/or a related structure) is divided, e.g. into subblocks or subblock groups, like code block/s and/or code block group/s. A transmission format may in some cases pertain to more than one data block, and/or may pertain to more than one acknowledgement signaling process. It may be considered that a transmission format indicates size in bits and/or coding for the one or more data block structures or substructures. A transmission format may pertain to signaling to be transmitted by a radio node, or to signaling to be received, and/or to acknowledgement signaling pertaining to signaling to be received. For different communication directions, and/or different carriers and/or bandwidth parts, and/or sets thereof, and/or different configurations, in particular different configurations of the set of acknowledgement configurations, different transmissions formats may be utilized, e.g. defined and/or configured. In particular, a transmission format for transmission based on a retransmission configuration may be different from a transmission format associated to an acknowledgement configuration like the feedback configuration. Transmission formats may be independently configured from each other, e.g. using different messages and/or different signaling, e.g. on different layers of the protocol stack.

A retransmission configuration may generally indicate whether and/or which data blocks or subblocks or subblock groups are to be retransmitted, or may be replaced by new transmission. Thus, a retransmission configuration may be considered a form of acknowledgement signaling. However, the retransmission configuration may in some variants additionally indicate resources for transmission, and/or schedule the transmissions or retransmissions. The retransmission configuration may be configured with one or more uplink grants. It may be considered that a retransmission configuration indicates a transmission format for signaling by the user equipment performing data transmission and/or the retransmission. A retransmission configuration may indicate and/or comprise a bit pattern (e.g., a bitmap), which may for example indicate which data block structure/s of a transmission format may be used for new transmission and which for retransmission.

The retransmission configuration may be configured with control signaling, for example physical layer signaling and/or DCI signaling, in particular an uplink grant.

There is also considered a program product comprising instructions adapted for causing processing circuitry to control and/or perform any of the methods described herein.

Also, a carrier medium arrangement carrying and/or storing a program product as described herein may be considered.

An acknowledgement configuration may generally be a code block group configuration, which may indicate a mapping of one or more acknowledgement information subpatterns (e.g., one or more bits) to one or more code block groups, each of which may comprise or consist of the same or a different number of code blocks, in particular one or more code blocks. Each subpattern may be mapped to one code block group. In some variants, an acknowledgement configuration may indicate a mapping of one or more subpatterns to one or more transport blocks, each of which may comprise and/or consist of one or more code block groups. Each subpattern may be mapped to one transport block. An acknowledgement configuration may pertain to a combination of code block group/s and transport block/s, in particular regarding the structure or transmission format of corresponding acknowledgement information. Analogously, a retransmission configuration may be a code block group configuration and/or transport block configuration, pertaining to the structure and/or transmission format of data signaling or control signaling, which may undergo an acknowledgement signaling procedure on the receiver side. An acknowledgement configuration may be considered to configure and/or format feedback or acknowledgement information pertaining to code block groups or transport blocks or code blocks, whereas a retransmission configuration may be considered to configure and/or format code blocks and/or code block groups and/or transport blocks.

A data block structure may correspond to a scheduled data block, e.g. for data signaling. The data blocks may be associated to separately scheduled transmissions, e.g. separate channels and/or instances and/or carriers and/or component carriers and/or data streams, e.g. in the context of carrier aggregation and/or multiple-antenna transmissions, e.g. MIMO (Multiple-Input, Multiple-Output). The data blocks and/or associated data signaling may be for downlink, or in some cases for sidelink. The acknowledgement signaling may generally be uplink signaling, but in some variants may be sidelink signaling. However, there may be considered cases in which data signaling is uplink signaling, e.g. in the context of retransmission performed by a user equipment. A subpattern may represent the acknowledgement information and/or feedback for the associated data block, e.g. with the size as indicated by an assignment indication. Different data blocks may be associated to different transmission instances and/or different acknowledgment signaling processes, e.g. HARQ processes. An acknowledgement signaling procedure may comprise one or more acknowledgement signaling processes, which may pertain to the same communication direction.

A data block structure may generally represent, and/or be associated to, a scheduled data block and/or corresponding signaling. The data block may be scheduled for reception, e.g. by control signaling, in particular a control information message, which may be a scheduling assignment. In some cases, a scheduled data block may not be received, which may be reflected in the corresponding acknowledgement signaling. A number of data block structures, and/or the number of assignment indications, may be considered to represent a number of transmissions of data scheduled to be received by the user equipment (or second radio node).

A data block structure may generally represent, and/or correspond to, a data block, which may generally be a block of data and/or bits. A data block may for example be a transport block, code block, or code block group. It may be considered that a data block structure represents a data block which may be intended to be subjected to an acknowledgement signaling process. A data block may comprise one or more subblocks, which may be grouped into one or more subblock groups, e.g. code block groups. A data block may in particular be a transport block, which may comprise one or more code blocks and/or one or more code block groups. A data block structure may be considered to accordingly represent a transport block, code block or code block group.

A subblock group like a code block group may comprise one or more subblocks, e.g. code blocks. It may be considered that a data block comprises one or more subblock groups, which may have the same or different sizes (e.g., in number of bits, e.g. systemic and/or coding bits). It may be considered that a data block comprises information bits or systemic bits (which may be considered to represent data to be transmitted) and/or coding bits, e.g. bits for error coding like error detection and/or error correction coding, and/or parity or CRC (Cyclic Redundancy Check) bits. A subblock (e.g., code block) and/or subblock group (e.g., code block group) may analogously comprise systemic and/or coding bits.

An acknowledgment signaling process may be a HARQ process, and/or be identified by a process identifier, e.g. a HARQ process identifier or subidentifier.

Acknowledgement signaling and/or associated acknowledgement information may be referred to as feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock. Generally, to an acknowledgment signaling process there may be associated one specific subpattern and/or a data block structure, for which acknowledgment information may be provided.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgement information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilizing an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied, however, it may be considered to apply either or both. In some specific variants, neither the code block group/s nor the transport block comprise additional layers or error detection or correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

Generally, the acknowledgement signaling may be signaling at one instance and/or in one transmission timing structure, and/or scheduled for common transmission and/or the acknowledgement information may be jointly encoded and/or modulated. The acknowledgement information may pertain to a plurality of different transmissions, associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

A radio node, in particular a configuring radio node, may generally be adapted for scheduling data blocks for transmission and/or to provide and/or determine and/or configure associated assignment indications, which may include a total assignment indication. Configuring a second radio node or a UE may comprise such scheduling and/or associated determining and/or configuring and/or providing of the assignment indications.

A signaling characteristic may represent a physical layer characteristic, and/or resources and/or resource structures in a reception resource pool, which may be different from the transmission resource pool. Resources and/or resource structures representing signaling characteristics of characterizing signaling, in particular downlink (or sidelink) control signaling, and/or a corresponding pool, may in particular comprise one or more CORESETs (COntrol REsource SETs), each of which may represent a group or subpool. A CORESET may be associated to a specific time interval, in particular in a transmission timing structure like a slot, e.g. one or more symbols. It may be considered that a first CORESET is configured for the 1, 2, or 3 first symbols in a slot. A second CORESET may be configured for one or more later symbols, e.g. the 5th and/or 6th symbol of the same slot. In this case, the second CORESET may in particular correspond to mini-slot related signaling, e.g. comprise resource structures associated to short (e.g., 1 or 2 symbols) response control signaling, and/or a short latency requirement (e.g., 1 or 2 symbols), and/or received or scheduled transmission in a mini-slot and/or in response to a mini-slot, e.g. mini-slot data signaling. The first CORESET may be associated to slot-based signaling, e.g. long data signaling (e.g., longer than 2, 3 or 4 symbols), and/or response control signaling with relaxed latency requirement (e.g., more than 1 or 2 symbols, and/or allowing transmission in a later transmission timing structure like a later slot or subframe), and/or long response control signaling, e.g. longer than 2 or 3 or 4 symbols. Generally, different CORESETs may be separated in time domain by at least 1 symbol, in particular by 1, 2, 3 or 4 symbols. However, in some cases, the CORESETs, and/or more generally, subpools, may overlap or be neighbored in time. Depending in which of the groups or subpools, in particular CORESETs, characterizing signaling is received, it may be associated to a specific subpool or group of the transmission resource pool. A reception resource pool may be predefined and/or configured to the responding radio node, e.g. by the receiving radio node, which may alternatively or additionally configure the transmission resource pool. A pool configuration may generally be predefined, or performed by the network or a network node (e.g., a receiving radio node), or another responding radio node taking the corresponding functionality and/or also operating as a receiving radio node, e.g. in sidelink communication (in which the configuration may be performed by another UE, or the network/network node). The transport block size, and/or a transmission mode, and/or operational conditions, may be considered other examples of a signaling characteristic. An operational condition may for example be dependent on and/or indicate latency conditions for one or more data streams and/or acknowledgement processes; this does not necessarily have to be a data stream or process acknowledgement information to be transmitted pertains to, e.g. to allow preemption with low impact. A signaling characteristic may represent a channel, e.g. a physical channel, e.g. a shared or dedicated channel, and/or a channel for URLLC or a channel for broadband signaling (e.g., eMBB), and/or a channel for MTC-related transmission. In some variants, one or more signaling characteristics may be indicated implicitly or explicitly, e.g. utilizing control signaling.

A resource structure may represent time and/or frequency and/or code resources. In particular, a resource structure may comprise a plurality of resource elements, and/or one or more resource blocks/PRBs. To a resource structure, there may be associated a type of signaling, in particular control signaling, and/or a signaling format, and/or a latency requirement. A latency requirement may in particular define when, after receiving signaling, the response has to be transmitted, e.g. with delay that may allow for processing. The requirement may define a delay of 1 symbol or 2 symbols between the end of the received signaling and the transmission of response control signaling, in particular acknowledgement signaling pertaining to the received signaling, e.g. data signaling. A resource structure may correspond to resources in the transmission resource pool. Different resource structures may differ in at least one resource element. Resource structures may be arranged and/or grouped in the transmission resource pool, e.g. according to a configuration, which may be a higher layer configuration, e.g. based on MAC or RRC signaling. Short response control signaling may generally be associated to a short format, e.g. short PUCCH or short PSCCH, e.g. according to NR standardization, if applicable. Long response control signaling may generally be associated to a long format, e.g. long PUCCH or long PSCCH.

Signaling may be considered to carry a message and/or information, if the message and/or information is represented in the (modulated) waveform of the signaling. In particular, extraction of a message and/or information may require demodulation and/or decoding of the signaling. Information may be considered to be included in a message if the message comprises a value and/or parameter and/or bit field and/or indication or indicator representing the information, or more than one or a combination thereof. Information included in such a message may be considered to be carried by the signaling carrying the message, and vice versa. A signaling characteristic, however, may pertain to a characteristic accessible without demodulation and/or decoding, and/or may be determined or determinable independent thereof. However, in some cases it may be considered that signaling is demodulated and/or decoded to determine whether the characteristic is associated to specific signaling, e.g. if the resources characterizing the signaling actually belong to control signaling and/or to signaling intended for the responding radio node or user equipment. Also, in some cases, the characteristic may be provided as information in a message, in particular if the characterizing signaling is not carrying the selection control message. Generally, selection of the resource structure may be based on one or more than one signaling characteristics. A signaling characteristic may in particular represent one or more resources, in particular in time domain, e.g. beginning and/or end and/or duration of the signaling, e.g., represented in symbol/s, and/or frequency range or resources of the signaling, e.g. represented in subcarrier/s, and/or numerology of the signaling, in particular of control signaling or data signaling like PDSCH signaling or PSSCH signaling. In some cases, the characteristic may indicate a message format, e.g. a format of the selection control message, for example an associated DCI or SCI format. It may generally be considered that a signaling characteristic represents and/or indicates a DCI format and/or search space (e.g., reception pool) and/or code, e.g. scrambling code, and/or an identity, e.g. one of different identities (like R-NTI or C-NTIs) assigned to the responding radio node or user equipment. Control signaling may be scrambled based on such identity.

The approaches described herein allow flexible acknowledgement signaling without unduly increase of overhead. In particular, the selection of a feedback configuration out of a set lowers the overhead for low level control signaling, e.g. signaling carrying DCI or SCI. With configuring the retransmission configuration, efficient handling of flexible transmission formats is provided. The approaches are in particular suitable to easily adapt to demands on latency and/or transmission correctness depending on use cases, which may be defined by, and/or be dependent on, requirements of an information system connected to the RAN.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
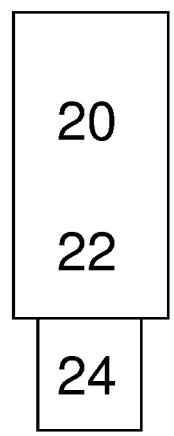
FIG. 1, showing an exemplary radio node implemented as a user equipment.

In the following, examples of the approaches are described in the context of NR technology. However, the approaches may be considered for other RATs as well. HARQ bits may be considered examples of acknowledgement information, respectively of subpatterns thereof. In general, instead of single HARQ feedback bits, larger subpatterns may be used. Also, communication between a network node and a UE is discussed by way of example. However, sidelink communication or backhaul communication, between two UEs or two network nodes, respectively, may be considered.

Code block groups are described in more detail. A transport block may be segmented or divided into multiple code blocks if the transport block exceeds a certain size. For error detection, each code block as well as the transport block may have its own CRC. In some cases, a single HARQ feedback bit may be generated per transport block. In addition, NR also supports code block group (CBG) HARQ feedback. Here, one or multiple code blocks are grouped into a CBG, and one HARQ feedback bit is generated for each CBG. This facilitates that only a fraction of the transport block needs to be retransmitted, if only one or few CBG are in error.

CBG-based feedback can be particular useful for very large transport blocks, where a re-transmission of the complete transport block would lead to large overhead if only one or few code blocks are in error. With CBG-based feedback, only the code block groups in error can be retransmitted. Another application of CBG-based feedback is preemption, where an ongoing transmission is interrupted in favor of a low latency transmission. If the preempting transmission is only of short duration, just a few code blocks might be destroyed, favoring again a selective transmission of individual code blocks.

Mini-slots or non-slot-based transmissions may be considered. NR supports slot-based transmission, where a DL assignment (or scheduling assignment, typically contained in a DCI transmitted on PDCCH) may be received at the beginning of a slot. The scheduled DL transmission (e.g., PDSCH) typically may also start early in the slot.

In addition, NR also supports non-slot-based transmissions or mini-slots. Here, the scheduled DL transmission (e.g., PDSCH) can in principle start at any symbol, also the transmission duration is flexible and usually (significantly) shorter than a slot duration. The scheduling PDCCH might be either located at the beginning of the slot or at the beginning of the actual DL transmission, or in a suitable CORESET. The latter is especially useful for low latency transmission, where the determination that a transmission needs to be scheduled happens late and slot-based scheduling is no longer possible. Mini-slots are therefore especially useful for above mentioned low latency transmissions which might interrupt (preempt) an already ongoing transmission.

In NR terminology, a slot-based transmission is also denoted as PDSCH scheduling Type A, while non-slot-based transmission (mini-slot) is denoted PDSCH transmission Type B.

Exemplary DL control signaling is discussed in more detail. DL assignments and UL grants are contained in Downlink Control Information (DCI) messages that are typically sent on the PDCCH. The resources a UE searches for a PDCCH candidate are typically organized in a control resource set (CORESET). Within a CORESET a UE might have one or more search spaces configured. A search space is an arrangement of physical resources within the CORESET which the UE needs to search for PDCCH candidates and the contained DCI. Typically, PDCCH candidates and/or DC's of different sizes are organized in different search spaces. A UE needs to determine if a detected PDCCH candidate is for the UE. This could for example be done by including a UE identifier (e.g. RNTI) into the DCI, or scrambling the CRC of the encoded DCI with the UE identity (e.g. RNTI). For Polar codes, which may be used to encode DCI, UE identify (e.g. RNTI) can also be put on frozen bits, a particularity of Polar codes.

A carrier may be portioned into bandwidth parts (BWP). Bandwidth parts can have multiple usages. One of the envisioned usage scenarios is to enable multiple numerologies mixed in frequency-domain on the same carrier. A BWP configuration may indicate a set of frequency-domain resources, and an associate numerology. A UE can be configured with one or multiple BWP parts. DL and UL configurations (and/or SL configurations) may be are independent from each other. Typically, each BWP has its own associated CORESET for the scheduling DCI.

CBG configuration connected to a carrier does lead to a non-desired behavior in case of the preemption scenario outlined above: A UE that is configured with both slots and mini-slot on the same carrier would have the same CBG configuration for both. However, mini-slots are typically used to preempt an ongoing transmission (either for the same or another UE). Mini-slots respectively the sizes of data/transport block transmitted therein are typically small. A CBG configuration for its HARQ feedback may be disadvantageous. However, slot based transmission can be large, and/or can be preempted. Having a CBG configuration for HARQ feedback of slots can increase efficiency of the wireless system.

Accordingly, there is suggested providing several different CBG/transport block configurations used for HARQ feedback pertaining to a transmission, e.g. for a carrier. Which configuration is selected may but tied to, or be determined based on, a signaling characteristic like a physical layer characteristic of the transmission. Multiple CBG configurations (which may include one or more transport block configurations) can co-exists and the appropriate one may be selected based on a physical layer characteristic of the transmission.

Examples of physical layer characteristics of a transmission are CORESET, PDCCH candidate that has been used for scheduling the transmission, RNTI contained in the scheduling DCI (either implicit or explicit), DCI that has been used for scheduling the transmission, any information contained in the DCI, the time and/or frequency location of the scheduled transmission, BWP, DCI format.

As an alternative, a CBG configuration may be modified by the UE for a mini-slot based transmission, e.g. to use transport block based feedback instead. The modification may be considered defining a second configuration based on the CBG configuration.

Examples of multiple CBG configurations may be considered. A CBG configuration may not the same for a carrier, but may be tied to a physical layer characteristic of the transmission (from a UE perspective, this would be typically a received DL or sidelink transmission). On one carrier, multiple CBG configurations can co-exists, and the appropriate one is selected based on a physical layer characteristic of the transmission. The UE uses then the selected CBG configuration when it constructs and transmits its HARQ feedback for the transmission. The multiple CBG configurations may be considered to represent a set of acknowledgement configurations. Instead of being configured for a carrier, they may be configured for one or more carriers and/or BWPs and/or carrier aggregations and/or sets of carriers. A retransmission configuration may be configured analogously.

A carrier can for example be configured with slot-based and non-slot based transmissions (mini-slots). A first CBG configuration could apply for HARQ feedback of slot-based transmission, while another CBG configuration (e.g. to use transport block based feedback) could apply to HARQ feedback of non-slot-based transmissions. Often HARQ feedback for a non-slot-based transmission would not use CBG-based feedback, but transport block based feedback.

Slot and mini-slot may be scheduled by scheduling assignments contained in DCI transmitted on a PDCCH. The CBG configuration to use for the HARQ feedback could be associated with any parameter (signaling characteristic) that is different for slots and non-slot-based transmissions. For example, if different CORESETs or search spaces are used to schedule slots and non-slot-based transmissions, the CBG configuration could be associated with CORESET or search space. A CORESET or search space configuration can also contain a CBG configuration. If different RNTIs are used to schedule slots and non-slot-based transmissions, different CBG configurations may be configured for the different RNTIs, and may be selected based on a RNTI used for scheduling.

In general, a set of different CBG configurations may be configured, e.g. on a carrier. Information in the DCI (either implicit or explicit), e.g. a configuration indication, may select one of the configured CBG configurations that should be used for the HARQ feedback of the transmission scheduled by the DCI. Basing the CBG selection on RNTI is an example how information contained in the DCI implicitly selects the CBG configuration.

The DCI could contain a bit field that determines the time-domain resources of the scheduled transmission, e.g. start symbol and/or slot and end symbol and/or slot. This bit field could also be used to determine the CBG configuration used in the HARQ feedback. The DCI field determining the time-domain resources can also—e.g., instead of, or in addition to, explicitly indicating a start and stop position—select one out of a set of configured time-domain resource allocations.

An example for an explicit indication would be to include in a DCI an explicit bit or bit field that selects the CBG configuration for HARQ feedback out of a set of CBG configurations configured, e.g. for the carrier.

The DCI size itself might also be used to select between multiple configured CBG configurations. A transmission that should use CBG based feedback might have CBG-specific DCI fields which can be omitted for a transmission that should not use CBG-based feedback. The presence/non-presence of such a field or the DCI size can thus be used to select a CBG configuration for the HARQ feedback.

The CBG configuration for the HARQ feedback can also be based on properties of the transmission itself. A set of CBG configurations may be configured, and a configuration may be selected based on one or more properties (signaling characteristics) of the transmission. Such a property could e.g. be where in the time-frequency domain the transmission is located. One example could be transmission length and/or transport block size. If the transmission length is below a certain threshold, a second CBG configuration may be selected, whereas for transmission above or equal to this threshold, a first CBG configuration may apply. Instead of transmission length, the transport block size, or the number of code blocks within the transport block could select one of two or more configured acknowledgement/CBG configurations.

Another possibility is to have per-BWP CBG configurations. Depending on the BWP in which the transmission is scheduled, the appropriate CBG configuration may be selected and used in the HARQ feedback transmission. If BWP have their own CORESET (or other distinguishing PDCCH properties) also PDCCH properties as explained earlier can be used.

Note that transport block based feedback is also considered as (a very simple) CBG configuration.

Modified CBG configuration is discussed in the following. If only a single CBG configuration explicitly exists, e.g. on a carrier, another possibility is that the UE modifies the configured CBG configuration and uses the modified CBG configuration for HARQ feedback. Thus, an alternative configuration is created, defining a set of two configurations. An important part of a CBG configuration is the max number of CBG the UE should use for its HARQ feedback. In case a UE has fewer or maybe even only one code block (and thus code block group), a CBG configuration may be unnecessary or undesired. The UE may modify the number of CBG in its HARQ report as a function of code blocks in the received transmission. For example, if the received transmission contains a transport block with only one code block (or multiple but below a threshold code blocks) a UE may use a transport block based HARQ feedback and select/create a corresponding configuration.

Generally, a carrier can be configured with multiple CBG configurations. Which CBG configuration is applied for the HARQ feedback transmission may be determined by a physical layer characteristic of the transmission the HARQ feedback is associated with.

FIG. 1 schematically shows a radio node, in particular a terminal or wireless device which may in particular be implemented as a UE (User Equipment). Radio node 10 comprises processing circuitry (which may also be referred to as control circuitry) 20, which may comprise a controller connected to a memory. Any module of the radio node e.g. a communicating module or determining module, may be implemented in and/or executable by the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 2:
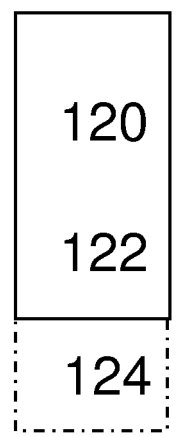
FIG. 2, showing an exemplary radio node implemented as a network node.

FIG. 2 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Figure 3:
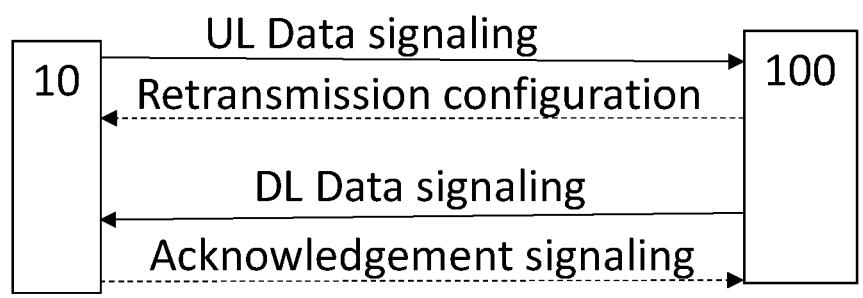
FIG. 3, schematically showing a communication setup between two radio nodes.

FIG. 3 shows an exemplary setup comprising a UE 10 and a radio node 100, which may be a base station for NR, e.g. an eNB or gNB. The radio node 100 may transmit DL data signaling, in response to which the UE 10 may transmit acknowledgement signaling utilizing a feedback configuration selected from a set of acknowledgement configurations, which may be configured or predefined. The DL data signaling and/or the acknowledgement signaling may be scheduled with DCI, e.g. a scheduling assignment, which in some cases may indicate a transmission format for the acknowledgement signaling. In the other communication direction, the UE may transmit UL data signaling, in response to which the radio node 100 may transmit a retransmission configuration. The retransmission configuration may be transmitted as DCI, and/or may include scheduling information for future UL transmission. In particular, it may be included in an UL or scheduling grant. The retransmission configuration may indicate whether and/or which code blocks or code block groups and/or transport blocks transmitted with UL data signaling have to be retransmitted, e.g. utilizing a corresponding bitmap, and/or indicating a corresponding transmission format.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilizing and/or via such intermediate system/s. Providing information may be for radio transmission and/or for transmission via an air interface and/or utilizing a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission).

It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more sy and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling.

Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A resource pool generally may indicate and/or comprise resources, in particular time-frequency resources, e.g. time and frequency intervals, which may be contiguous or interrupted, and/or code resources. A resource pool may in particular indicate and/or comprise resource elements and/or resource blocks, e.g. PRBs. A radio node like a user equipment may be considered to be configured with a resource pool if it received corresponding control signaling configuring it therewith. Such control signaling may in particular be transmitted by a receiving radio node as described herein. The control signaling may in particular be higher layer signaling, e.g. MAC and/or RRC signaling, and/or may be semi-static or semi-persistent. In some cases, the responding radio node or user equipment may be considered configured with a resource pool, if it is informed about a corresponding configuration, e.g. that it may access resources in the pool for transmitting. Such a configuration in some cases may be predefined, e.g. based on a standard and/or default configuration. A resource pool may be dedicated to one responding radio node or user equipment, or in some cases shared between several. It may be considered that a resource pool may be general, or for specific types of signaling, e.g. control signaling or data signaling. A transmission resource pool may in particular be for control signaling, e.g. uplink control signaling and/or sidelink control signaling, and/or may be dedicated to the user equipment/responding radio node. It may be considered that a resource pool comprises a plurality of resource structures, which may be arranged in subpools or groups, e.g. pertaining and/or according to type of (received or scheduled) signaling or type of response control signaling. Each group or subpool may comprise a number of resource structures, wherein the number may be representable by an indicator and/or bit field of the selection control information. For example, the maximum number of resource structures in a group may correspond to the maximum number of different values representable by the bit field or indicator. Different groups may have different numbers of resource structures. It may generally be considered that a group comprises a smaller number of resource structures than representable by the indicator or bit field. A resource pool may represent a search space and/or space of availability of resources and/or resource structures available for specific signaling. In particular, a transmission resource pool may be considered to represent a (time/frequency and/or code) domain or space of resources available for response control signaling.

A signaling characteristic may represent resources and/or resource structures in a reception resource pool, which may be different from the transmission resource pool. Resources and/or resource structures representing signaling characteristics of characterizing signaling, in particular downlink (or sidelink) control signaling, and/or a corresponding pool, may in particular comprise one or more CORESETs (COntrol REsource SETs), each of which may represent a group or subpool. A CORESET may be associated to a specific time interval, in particular in a transmission timing structure like a slot, e.g. one or more symbols. It may be considered that a first CORESET is configured for the 1, 2, or 3 first symbols in a slot. A second CORESET may be configured for one or more later symbols, e.g. the 5th and/or 6th symbol of the same slot. In this case, the second CORESET may in particular correspond to mini-slot related signaling, e.g. comprise resource structures associated to short (e.g., 1 or 2 symbols) response control signaling, and/or a short latency requirement (e.g., 1 or 2 symbols), and/or received or scheduled transmission in a mini-slot and/or in response to a mini-slot, e.g. mini-slot data signaling. The first CORESET may be associated to slot-based signaling, e.g. long data signaling (e.g., longer than 2, 3 or 4 symbols), and/or response control signaling with relaxed latency requirement (e.g., more than 1 or 2 symbols, and/or allowing transmission in a later transmission timing structure like a later slot or subframe), and/or long response control signaling, e.g. longer than 2 or 3 or 4 symbols. Generally, different CORESETs may be separated in time domain by at least 1 symbol, in particular by 1, 2, 3 or 4 symbols. Depending in which of the groups or subpools, in particular CORESETs, characterizing signaling is received, it may be associated to a specific subpool or group of the transmission resource pool. A reception resource pool may be predefined and/or configured to the responding radio node, e.g. by the receiving radio node, which may alternatively or additionally configure the transmission resource pool. Pool configuration may generally be predefined, or performed by the network or a network node (e.g., a receiving radio node), or another responding radio node taking the corresponding functionality and/or also operating as a receiving radio node, e.g. in sidelink communication (in which the configuration may be performed by another UE, or the network/network node).

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilizing, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (COI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbors at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, its transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CDM | Code Division Multiplex |
| CM | Cubic Metric |
| CORESET | Control channel Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDM | Frequency Division Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |

-continued

| Abbreviation | Explanation |
|---|---|
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RB | Resource Block |
| RNTI | Radio Network Temporary Identifier |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

What is claimed is:

1. A method of operating a user equipment in a New Radio, NR, radio access network, the method comprising:
   transmitting acknowledgement signaling based on a feedback configuration, the feedback configuration being selected from a set of acknowledgement configurations based on a Downlink Control Information, DCI, format of received control signaling; and
   at least one acknowledgement configuration of the set of acknowledgement configurations indicating a mapping of at least one acknowledgment bit subpattern to at least one code block group.

2. The method according to claim 1, wherein acknowledgement signaling represents acknowledgement information, the acknowledgement information being structured based on the feedback configuration.

3. The method according to claim 1, wherein acknowledgment configurations of the set of acknowledgment configurations pertain to one of:
   a same bandwidth part;
   a carrier; and
   a carrier aggregation.

4. The method according to claim 1, wherein at least one acknowledgement configuration of the set of acknowledgement configurations is configured with Radio Resource Control layer signaling.

5. A user equipment for a New Radio, NR, radio access network, the user equipment comprising processing circuitry, the user equipment being configured to utilize the processing circuitry to:
   transmit acknowledgement signaling based on a feedback configuration, the feedback configuration being selected from a set of acknowledgement configurations based on a Downlink Control Information, DCI, format of received control signaling; and
   at least one acknowledgement configuration of the set of acknowledgement configurations indicating a mapping of at least one acknowledgment bit subpattern to at least one code block group.

6. The user equipment according to claim 5, wherein acknowledgement signaling represents acknowledgement information, the acknowledgement information being structured based on the feedback configuration.

7. The user equipment according to claim 5, wherein the acknowledgment configurations of the set of acknowledgment configurations pertain to one of:
   a same bandwidth part;
   a carrier; and
   a carrier aggregation.

8. The user equipment according to claim 5, wherein at least one acknowledgement configuration of the set of acknowledgement configurations is configured with Radio Resource Control layer signaling.

9. A network node for a New Radio, NR, radio access network, the network node comprising processing circuitry and being configured to utilize the processing circuitry to:
   configure a user equipment with at least one acknowledgement configuration of a set of acknowledgement configurations;
   transmit, to the user equipment, control signaling having a Downlink Control Information, DCI, format, indicating a feedback configuration to be selected from the set of acknowledgement configurations based on which the user equipment is to transmit acknowledgement signaling; and
   the at least one acknowledgement configuration of the set of acknowledgement configurations indicating a mapping of at least one acknowledgment bit subpattern to at least one code block group.

10. The network node according to claim 9, wherein acknowledgement signaling represents acknowledgement information, the acknowledgement information being structured based on the feedback configuration.

11. The network node according to claim 9, wherein the acknowledgment configurations of the set of acknowledgment configurations pertain to one of:
   a same bandwidth part;
   a carrier; and
   a carrier aggregation.

12. The network node according to claim 9, wherein at least one acknowledgement configuration of the set of acknowledgement configurations is configured with Radio Resource Control layer signaling.

* * * * *